(No Model.)
C. H. DALE.
CONNECTING HOSE TO NIPPLES.
No. 590,258.                     Patented Sept. 21, 1897.
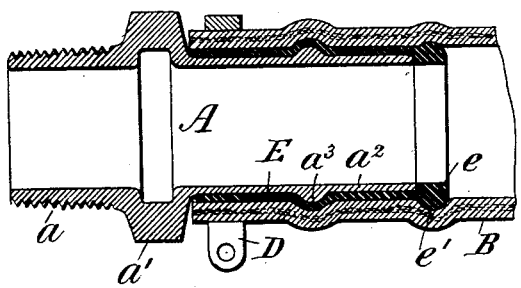
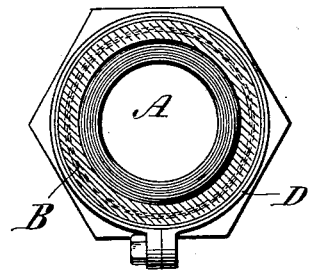
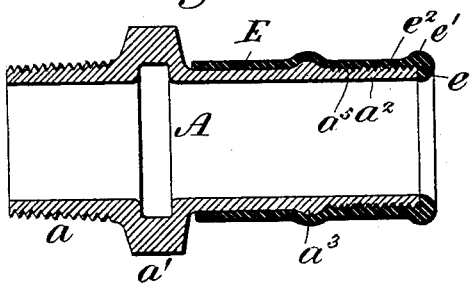
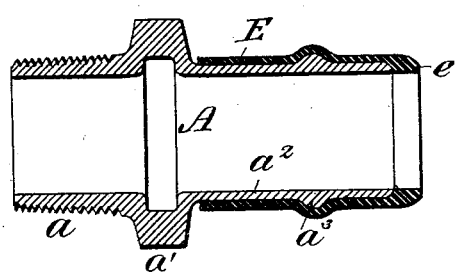
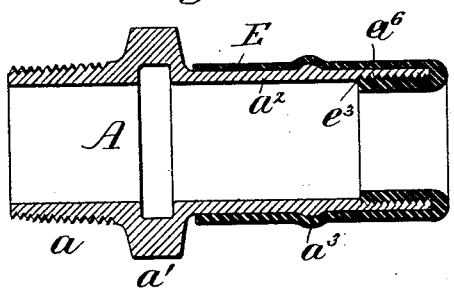
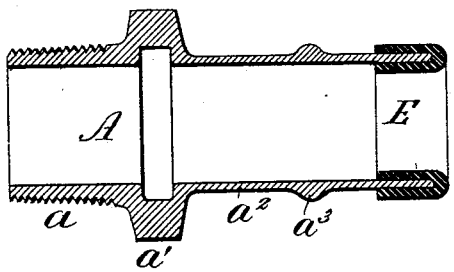
WITNESSES:
INVENTOR
Charles H. Dale
BY Edwin H. Brown
his ATTORNEY

UNITED STATES PATENT OFFICE.

CHARLES H. DALE, OF NEW YORK, N. Y., ASSIGNOR TO JENNIE L. DALE, OF SAME PLACE.

CONNECTING HOSE TO NIPPLES.

SPECIFICATION forming part of Letters Patent No. 590,258, dated September 21, 1897.

Application filed January 11, 1897. Serial No. 618,713. (No model.)

*To all whom it may concern:*

Be it known that I, CHARLES H. DALE, of New York, in the county and State of New York, have invented a certain new and useful Improvement in Connecting Hose to Nipples, of which the following is a specification.

The object of my improvement is to lessen the injury occasioned to hose of various kinds by bending or abrasion incident to its contact with the end of a nipple or analogous part. Perhaps its most important application is to the hose used in connection with air-brakes, where such hose is united to the nipples of metal comprised in the connections.

My improvement consists in arranging intermediate the hose and nipple a yielding substance, which will prevent any injurious action of the nipple upon the hose. This intermediate substance may be made in the form of a cap or facing piece applied to the nipple.

In the accompanying drawings I have illustrated my invention in connection with brake-hose and nipples.

Figure 1 is a central longitudinal section of a nipple and a cap or facing piece of yielding substance applied thereto. It also shows a piece of hose and a clamp for fastening it. Fig. 2 is an end view. Figs. 3, 4, 5, and 6 are views like Fig. 1 except that the hose and its clamp are omitted.

Similar letters of reference designate corresponding parts in all figures.

A designates a nipple, which is represented as being of the ordinary kind used for hose connections in railway-brakes. It has an externally-screw-threaded portion $a$, an angular portion $a'$, suitable for engagement by a wrench, and a portion $a^2$, on whose exterior the hose is to be secured.

B designates hose, which may be of ordinary construction, made up of an inner tube or lining of soft rubber, external layers of cloth cemented together by soft rubber, and an exterior of soft rubber. A clamp D is shown for securing the end of the hose upon the nipple. This clamp may be of any suitable construction.

E designates a cap or facing piece of yielding substance—as, for instance, soft rubber. In Figs. 1 and 2 this cap or facing piece is made in the form of a cylinder, adapted to be fitted upon that portion $a^2$ of the nipple upon which the hose B is fitted, and an inwardly-extending flange $e$, capable of lapping over the extremity of the said portion $a^2$ of the nipple.

As here shown, the portion $a^2$ of the nipple has a circumferential rib $a^3$, which will conduce to retain the cap or facing piece in place. I have here shown the outer extremity of the cap or facing piece as provided with a circumferential rib or enlargement $e'$.

In Fig. 3 I have shown substantially the same construction as in Figs. 1 and 2, but here the outer portion of the part $a^2$ of the nipple is provided with an external screw-thread $a^5$, and the cap or facing piece is internally provided with a screw-thread $e^2$ for engaging therewith.

In Fig. 4 I have shown the same construction as in Fig. 1 except that I have here omitted the circumferential rib or enlargement $e'$, which is illustrated in Fig. 1.

In Fig. 5 I have shown that the outer portion of the part $a^2$ of the nipple may be provided with an internal screw-thread $a^6$ and that the cap or facing piece may be extended around the end of this part of the nipple and into the interior of this part of the nipple and provided with a screw-thread $e^3$ for engaging with said screw-thread $a^6$.

In Fig. 6 I have shown a cap or facing piece which is U-shaped in cross-section and adapted to embrace both the outside and the inside as well as to protect the end of the part $a^2$ of the nipple.

I wish to cover, broadly, as of the essence of my invention a yielding substance applied in the form of a cap or facing piece of any suitable construction, so that it or some portion of it will occupy a position intermediate the end of the nipple and the hose which is to be secured to the nipple, my object being to present a yielding surface to the hose instead of subjecting it to the rigid and necessarily somewhat rough extremity of the nipple. Thus I reduce the liability of injury to the hose at or near its point of contact with the extremity of the nipple.

By the term "nipple" herein I wish not only to include what is strictly known as a "nipple," but all analogous parts—as, for example, the end of any pipe—and by the term "hose" I wish to include everything in the nature of flexible tubing, especially that comprising soft rubber.

It would be within the spirit of my invention to employ at the end of the nipple only a facing-piece fastened appropriately to the nipple—as, for example, a protuberant facing-piece—such as is shown in some of the other figures projecting circumferentially farther than the exterior of the nipple. It would be within the spirit of my invention to employ such an end facing-piece with an inner piece fitting or engaging the inner surface of the nipple.

What I claim as my invention, and desire to secure by Letters Patent, is—

1. A hose-nipple, the end to which the hose is to be attached being provided with a yielding facing or cap piece of soft, yielding material interposed between the nozzle and hose to prevent injury by bending or abrasion, substantially as described.

2. A hose-nipple, the end to which the hose is to be attached being provided with a yielding facing or cap piece having a flange or transverse portion overlapping the end of the nipple, substantially as described.

3. A hose-nipple, the end to which the hose is to be attached being provided with a yielding facing or cap piece having an exterior circumferential rim, substantially as described.

4. A hose-nipple, the end to which the hose is to be attached being provided with a yielding facing or cap piece having a flange or transverse portion overlapping the end of the nipple and having an exterior circumferential rim, substantially as described.

In testimony whereof I have signed my name to this specification in the presence of two subscribing witnesses.

CHARLES H. DALE.

Witnesses:
C. C. MILLER,
W. G. ASHMEAD.